United States Patent
Juliana et al.

(10) Patent No.: US 11,254,545 B2
(45) Date of Patent: Feb. 22, 2022

(54) PASSENGER DETECTION SYSTEM AND METHOD FOR A PASSENGER MOVING SYSTEM

(71) Applicant: TK Elevator Innovation Center S.A., Gijon (ES)

(72) Inventors: José Mendiolagoitia Juliana, Gijón (ES); Marcos Pérez Pérez, Oviedo (ES); Isabel Gonzalez Mieres, Gijón (ES); Francisco Javier Sesma Sanchez, Gijón (ES); Adrián Álvarez Cuervo, Avilés (ES)

(73) Assignee: TK Elevator Innovation Center S.A., Gijon (ES)

( * ) Notice: Subject to any disclaimer, the term of this patent is extended or adjusted under 35 U.S.C. 154(b) by 0 days.

(21) Appl. No.: 16/949,034

(22) Filed: Oct. 9, 2020

(65) Prior Publication Data

US 2021/0107771 A1    Apr. 15, 2021

(30) Foreign Application Priority Data

Oct. 9, 2019    (EP) .................................... 19202122

(51) Int. Cl.
*B66B 25/00*    (2006.01)

(52) U.S. Cl.
CPC ............ *B66B 25/003* (2013.01); *B66B 25/00* (2013.01)

(58) Field of Classification Search
CPC .............................. B66B 25/00; B66B 25/003
USPC ................................................. 198/322, 324
See application file for complete search history.

(56) References Cited

U.S. PATENT DOCUMENTS

| | | | |
|---|---|---|---|
| 6,334,522 B2 | 1/2002 | Haruta et al. | |
| 6,606,538 B2 * | 8/2003 | Ponsot | B66B 25/00 198/322 |
| 8,708,130 B2 * | 4/2014 | De Coi | B66B 25/00 198/322 |
| 9,850,100 B2 * | 12/2017 | Blondiau | B66B 25/00 |
| 9,896,309 B2 * | 2/2018 | Wang | B66B 25/00 |
| 10,155,642 B2 * | 12/2018 | Ghadamossoltani | B66B 25/006 |
| 10,214,391 B2 * | 2/2019 | Wang | B66B 21/02 |

(Continued)

FOREIGN PATENT DOCUMENTS

| CN | 103663085 A | 3/2014 |
|---|---|---|
| EP | 1357077 B1 | 7/2009 |

(Continued)

OTHER PUBLICATIONS

Extended European Search Report for European Priority Application No. 19202122.8.

*Primary Examiner* — James R Bidwell
(74) *Attorney, Agent, or Firm* — William J. Cassin

(57) ABSTRACT

A method predicts whether an approaching passenger intends to travel on a passenger moving system having at least one movable pallet. The method includes positioning at least one monitoring device in the vicinity of the passenger moving system such that it monitors a detection area wherein the detection area includes at least a first detection area. The monitoring system then detects the presence of a passenger in the at least first detection area and monitors a trajectory of the passenger. A response is triggered at a control unit of the passenger moving system when the monitored trajectory of the passenger provides a predicted trajectory that reaches the entrance to the passenger moving system.

9 Claims, 3 Drawing Sheets

(56) References Cited

U.S. PATENT DOCUMENTS

| | | | | |
|---|---|---|---|---|
| 2005/0088520 A1* | 4/2005 | Wiesinger | ............ | B66B 29/005 |
| | | | | 348/143 |
| 2005/0121288 A1* | 6/2005 | Blondiau | ................ | B66B 25/00 |
| | | | | 198/322 |

FOREIGN PATENT DOCUMENTS

| | | | |
|---|---|---|---|
| JP | 2008007272 A | 1/2008 | |
| WO | 2015/171774 A1 | 11/2015 | |

* cited by examiner

PASSENGER DETECTION SYSTEM AND METHOD FOR A PASSENGER MOVING SYSTEM

CROSS-REFERENCE TO RELATED APPLICATIONS

This application claims foreign priority to European Patent Application No. EP19202122.8 filed Oct. 9, 2019, the entire contents of which is hereby incorporated by reference herein.

FIELD

This disclosure relates to moving walkways and methods of predicting whether approaching passengers intend to travel on the moving walkway.

BACKGROUND

Passenger moving systems preferably comprise elevators, escalators and moving walks. Normal operation of a passenger moving system, for example an escalator, involves operating at a nominal speed. Most typical nominal speeds are 0.5 m/s, 0.65 m/s and in some cases 0.75 m/s. Moving walks can work even with speeds up to 0.9 m/s according to existing safety regulation codes.

The passenger moving system, for example an escalator or a moving walk when running at a nominal speed has a high power consumption due to the running motor and the movement of the movable steps or pallets which experience mechanical losses due to friction. Power consumption can be reduced using an energy saving system. One such system is known as an "intermittent operation" or a "stop and go operation". Escalators and moving walks equipped with this system remain stopped when there are no passengers using the unit. When a passenger is detected, the escalator/moving walk starts at a nominal speed and then stops once the last passenger leaves the unit.

According to existing safety regulation codes, the passenger moving system must be moving when the passenger arrives to the movable steps or pallets. This means that any detection step(s) must be performed before the passenger enters the balustrade area. In addition, detection must be done from both sides to ensure that the escalator/moving walk will start if the passenger approaches at the wrong landing area in order to indicate the direction of travel. This aims to avoid a passenger stepping on to a moving step/pallet that is moving in the opposite direction.

Methods of passenger detection is known in the art including using radar sensors installed at both entrances of the passenger moving system, photocells at both landing areas of the passenger moving system or a weight detection system at the entry and exit of the passenger moving system. These systems however have at least the following drawbacks:

Any weight detection is typically performed in the floor plate to assure that there is enough time to start the escalator/moving walk. This system has to be installed in such a way that the landing plate itself descends a number of millimeters in order to activate the sensor. This downward sensation can cause a passenger to feel uncomfortable. Moreover, any person passing the escalator or moving walk entrance can walk on top the landing plate and accidentally trigger the escalator or moving walk to start.

To detect passengers with photocells, of which there are at least two, i.e., a receiver and an emitter, it is necessary to install them before the end of the balustrade at a distance of approximately 1.3 meters (m) to assure that the steps/pallets are moving before the user or passenger enters. This means that additional infrastructure is required, for example, one or more posts or a wall, in which the photocells can be located. It also means that an additional safety feature is needed in order to close off the area between the location of the photocells and the balustrade, for example, a safety barrier. This mitigates the risk that a passenger could enter and travel on the escalator or moving walk without being detected. This solution is usually expensive and not very practical because it requires obstacles in the passenger area.

Radar as a method for passenger detection has some inconveniences. For example, the radar must be adjusted to make sure that the passenger is detected with enough time to start the escalator but at the same time, the detection area must be controlled to avoid detecting non-passengers, i.e., a person which does not intend to use the escalator/moving walk. Detection of non-passengers can cause the unnecessary starting of the passenger moving system and thus wastes energy. Additionally, radars are usually very sensitive to light so in some conditions, for example near a window, the passenger moving system could start without any passenger being present.

Accurate detection of passengers trying to use an escalator provides an effective energy saving method. Additionally, passengers approaching the passenger moving system from the wrong direction is a safety risk, thus being able to avoid such a risk is particularly desired. Indeed, such a detection could be useful for other purposes including for example, detecting whether a passenger is approaching an elevator door, in which case the elevator door could be programmed to open automatically; or whether the passenger is just passing by the elevator door, with no intention of travelling in it, in which case the door would not need to open and energy can be saved.

CN 103663085 A describes a system that calculates distances and starts the escalator based on when a passenger approaches a certain distance in relation to the escalator. The system uses a laser sensor. However, there is no possibility to detect the trajectory of the passenger, thus when a passenger is merely passing by the escalator with no intention to travel on it, the escalator will nevertheless start. This causes an unnecessary waste of energy.

EP 1357077 B1 and U.S. Pat. No. 6,334,522 B2 both disclose a control apparatus for a passenger conveyor having two defined areas. When a passenger is detected in a first area, the system starts in a low speed mode. When the passenger enters a second area (which is closer to the escalator comb area) the escalator accelerates to nominal speed. However, this system also fails to detect the trajectory of the passenger, thus non-necessary starting of the escalator cannot be avoided.

The present disclosure addresses and solves the aforementioned problems in the art.

BRIEF DESCRIPTION OF THE DRAWINGS

The present invention is described in detail below with reference to the attached drawing figures, wherein.

DETAILED DESCRIPTION

Figure 1:
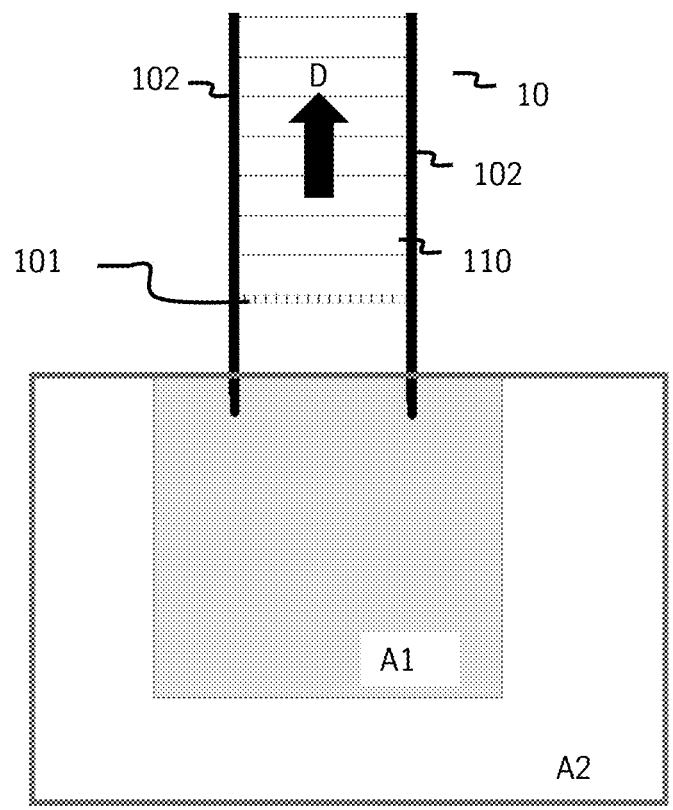
FIG. 1 is a top view of one end of a schematic representation of a passenger moving system having a first area and a second area.

The invention relates to a method of predicting whether an approaching passenger intends to travel on a passenger moving system comprising at least one movable pallet. Preferably the passenger moving system is an elevator, escalator, or moving walk, the escalator or moving walk comprising a plurality of movable pallets, the elevator comprising a movable pallet in the form of a floor of the elevator cabin. The method comprises the following method steps:
  a) positioning at least one monitoring device in the vicinity of the passenger moving system such that it monitors a detection area wherein the detection area comprises at least a first area (preferably a first area and a second area);
  b) detecting a passenger in at least the first area;
  c) monitoring, by the monitoring device, a trajectory of the passenger and using the monitored trajectory to predict via algorithms the future trajectory t of the passenger;
  d) triggering a response at the control unit of the passenger moving system when the monitored trajectory of the passenger provides a predicted trajectory that reaches the entrance to the passenger moving system.

Preferably the monitoring device is at least one selected from the group comprising: a 3D sensor, e.g., a 3D camera, time of flight (ToF) a scanner, a LiDar, and other such 3D devices. Preferably the monitoring device is adapted to be in communication with a control unit of the passenger moving system;

This method advantageously provides a method of monitoring not only the distance of a passenger in relation to the entrance or exit of a passenger moving system, but also a method of predicting the future trajectory of the passenger in relation to the entrance or exit of a passenger moving system, thereby ensuring that there are no unnecessary starts when a passenger merely passes by the entrance or exit to the moving system with no intention of travelling on it. Consequently, this saves energy and improves the lifespan of the moving system since it reduces unnecessary wear and tear caused by the starting and stopping process.

In an embodiment of the invention, the passenger moving system starts or remains stationary according to the predicted trajectory of the passenger.

In an embodiment of the invention, the passenger moving system starts when the predicted trajectory is >0, wherein the trajectory is measured against the longitudinal axis which is defined by the direction of the movement of the at least one moving pallet.

In an embodiment of the invention, the monitoring device is located at a height which allows the monitoring of at least the first detection area, preferably at least 1 meter (m) above floor level. Preferably, the monitoring device is located above a terminal end of the passenger moving system, wherein the terminal end can refer to the entrance or exit of the passenger moving system depending on its direction of travel. Preferably, the monitoring device is installed at both terminal ends of the passenger moving system to detect passengers about both potential moving directions. "Above a terminal end" preferably includes positioning a monitoring device e.g., in the ceiling directly above or indirectly above a terminal end of the passenger moving system. Preferably, the monitoring device is located at least 1 m above floor level, preferably at least 2.5 m above floor level, preferably at least 3 m above floor level; wherein "floor" refers to the floor in which the landing area is located. The first detection area preferably relates to the first detection area at both terminal ends of the passenger moving system. In an embodiment of the invention, the monitoring device is located up to 1 m above floor level at a height that allows the monitoring of at least the first detection area. For example, the monitoring device can be comprised within a balustrade or at balustrade level, i.e., not within a balustrade, but at a similar level thereto. The first detection area preferably relates to the first detection area at both terminal ends of the passenger moving system.

In an embodiment of the invention, the monitoring device monitors a second area, wherein the second area is larger than the first area. this advantageously provides a larger area from which data can be obtained in relation to the movement and the trajectory of the passenger which ultimately improves the predicted trajectory and gives more reliable information relating to whether the passenger moving system should be started or not.

In an embodiment of the invention, monitoring the trajectory of a passenger occurs in the first area. This advantageously ensures that only relevant data is used to determine and predict a trajectory of a passenger. When a passenger enters the first area, they are closer to a terminal end, in particular to the entrance of a passenger moving system, therefore the likelihood that they intend to travel on said system is greater.

In an embodiment of the invention, the monitoring device is a 3D sensor. Preferably the 3D sensor is at least one of a 3D camera, a time of flight (ToF) camera, a scanning device (preferably a 3D scanning device), a LiDar device, or any combination thereof.

This advantageously provides a method that can be adapted to use various sensors in order predict the trajectory of a passenger.

In an embodiment of the invention, the monitoring device can be equipped with a self-diagnostic system or tool, e.g., in the form of a piece of hardware or software or an algorithm. The terms "system" and "tool" can be used interchangeably. This advantageously allows for a "smart" system, which in the event an anomalous situation is detected over a period of time, the self-diagnostic activates an "error mode" which could for example change an intermittent operation of the passenger moving system to a continuous operation error detection, can be adapted to ensure that the passenger moving system does not come to a stop in order to avoid inconvenience to passengers. Once the error detection has been resolved, the system is able to revert to normal operation and the passenger moving system is able to start and stop according to passenger requirements.

The present disclosure relates to the use of a 3D sensor to monitor the position and trajectory of a passenger approaching a passenger moving system. This advantageously provides a method of predicting a future trajectory of the passenger that can be used to trigger the moving system to start.

FIG. 1 shows a passenger moving system 10 and the position of a first area A1 and a second area A2 in relation thereto. The passenger moving system 10 in this example is an escalator comprising movable steps 110 adapted to travel in the direction D. The first area A1 is comprised within the second area A2. The first area A1 comprises the terminal end of the escalator 10. In this embodiment, the terminal end is the entrance to the escalator 10. A monitoring device (not shown) monitors both the first area A1 and the second area A2 up to the line 101. Line 101 is the comb line where the movable steps 110 disappear below the landing plate for the turnaround. The comb line signifies an approximate monitoring limit reached by the monitoring device 11 in order to allow sufficient time for the system to start before the passenger 1 embarks on the movable steps 110 of the escalator 10. The monitoring device in this example is a 3D camera.

Since there are no passengers 1 in the either the first area A1 or the second area A2, the escalator 10 is stationary. The second area A2 in this embodiment has a length of 2 m from the line 101. The width is for example double the width between the handrails 102. In this second area A2, all passengers 1 are monitored and tracked by the monitoring device 11 (not shown in FIG. 1). The first area A1 in this particular example has a length of 1.5 m from the line 101 and a width that is 1.5 times the width between the handrails 102.

In general, when a passenger enters in the first area A1, if the monitored trajectory in the longitudinal axis, which is defined by the direction of the movement of the movable steps/pallets 110, is >0, then the passenger 1 is approaching the entrance of the passenger moving system 10 (e.g., an escalator/moving walk/elevator). In this particular example, the monitoring device 11 will send information to the control unit to start the escalator 10.

If the monitored trajectory in the longitudinal axis which is defined by the direction of the movement of the movable steps/pallets 110 is <0, or =0, then the passenger 1 is (a) walking parallel to the passenger moving system 10 (e.g., an escalator/moving walk/elevator perpendicular to D) or (b) is walking in the opposite direction to the entrance of the passenger moving system 10, in which case, the monitoring device 11 will not trigger any action at the control unit.

The monitoring device 11 has a self-diagnostic tool that is adapted to detect for example, anomalous behavior in the measurements of the 3D detection system over a predefined time. This is advantageous for example in cases when an anomalous situation is detected. The self-diagnostic tool allows for the generation of an error signal which is transmitted to the passenger moving system 10 (e.g., an escalator, or moving walkway, or an elevator), in particular to the control unit of the passenger moving system. The control unit then triggers an "error mode". An example of an error mode could be to change the running operation from automatic to continuous (i.e. changing from automatically starting and stopping the escalator 10 depending on passenger position, to where the escalator 10 continuously moves and is unable to stop, even if no passengers 1 have been detected in areas A1 or A2). Such an operation mode removes the need to carry out a monitoring process. When the error detection is no longer present, the self-diagnostic tool is designed to revert to the automatic operation, and the monitoring process begins.

Figure 2:
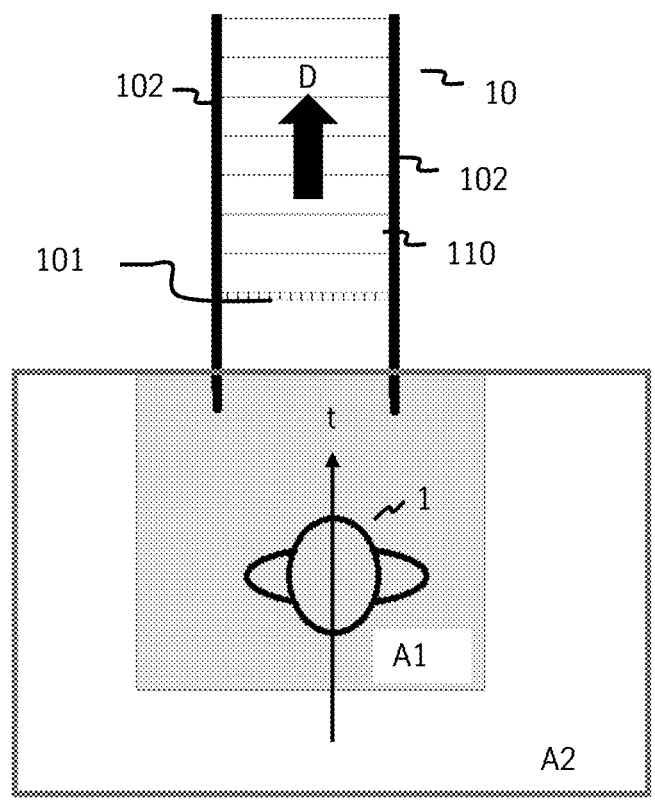
FIG. 2 is a top view of the passenger moving system of FIG. 1 showing a passenger positioned in the first area approaching the passenger moving system.

FIG. 2 shows the escalator 10 of FIG. 1 when a passenger 1 is directly approaching its entrance. The monitored trajectory t in the longitudinal axis, which is defined by the direction of the movement of the movable steps 110 is >0 (i.e. the passenger 1 is approaching the entrance of the escalator 10). Therefore, the monitoring device (not shown) sends information to a control unit (not shown) which immediately sends a command to start moving the movable steps 110 in the direction D. The monitoring device 11 continues to monitor the passenger 1 until they cross line 101.

Figure 3:
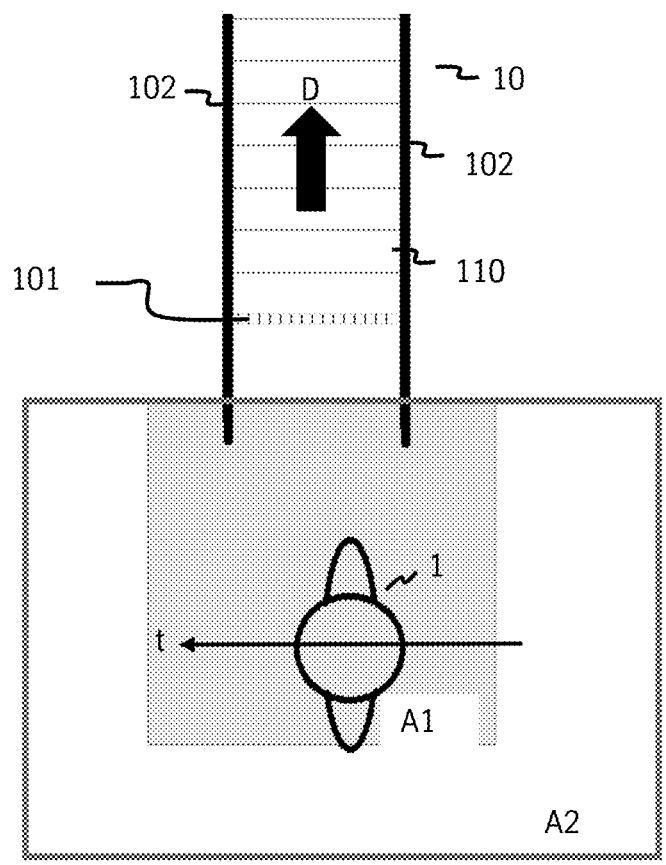
FIG. 3 is a top view of the passenger moving system of FIG. 1 showing a passenger traversing the first area.

In FIG. 3, a passenger 1 travels through the first area A1 and is thus monitored by the monitoring device 11. The trajectory t of the passenger is deduced. In this embodiment, the monitored trajectory in the longitudinal axis which is defined by the direction of the movement of the movable steps 110 is =0. In this embodiment, the passenger 1 is walking in a direction perpendicular to the entrance of the escalator 10 in which case, the monitoring device 11 does not trigger any action at the control unit, and the escalator 10 remains stationary.

Figure 4:
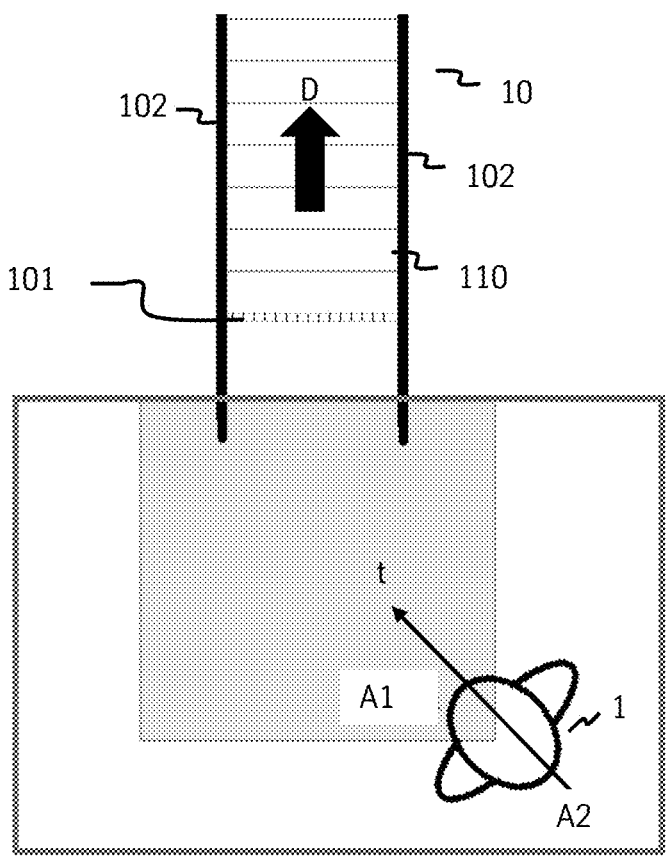
FIG. 4 is a top view of the passenger moving system of FIG. 1 showing a passenger approaching the passenger moving system by crossing from the second area into the first area.

In FIG. 4 the passenger 1 travels from the second area A2 to the first area A1 with a trajectory t. In this embodiment, the monitored trajectory in the longitudinal axis which is defined by the direction of the movement of the movable steps 110 is >0. The predicted trajectory t shows that the passenger 1 will eventually embark on the escalator 10. Therefore, the monitoring device (not shown) sends information to the control unit (not shown) which immediately sends a command to start moving the movable steps 110 in the direction D. The monitoring device 11 continues to monitor the passenger 1 until they cross line 101.

Figure 5:
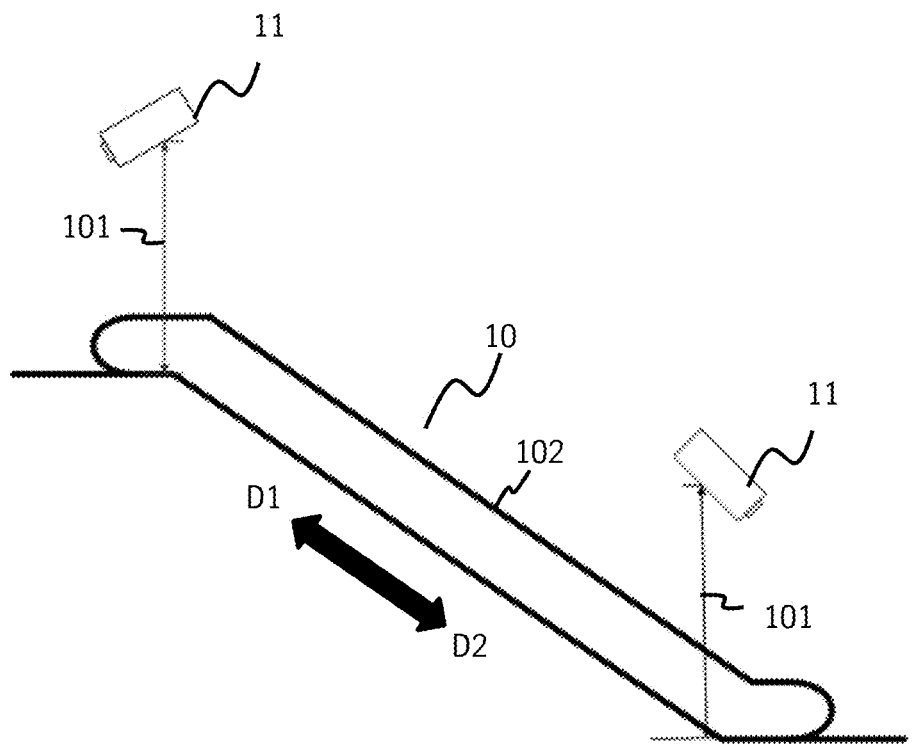
FIG. 5 is a side schematic view of an escalator system having a monitoring device disposed at each of its terminal ends.
Figure 6:
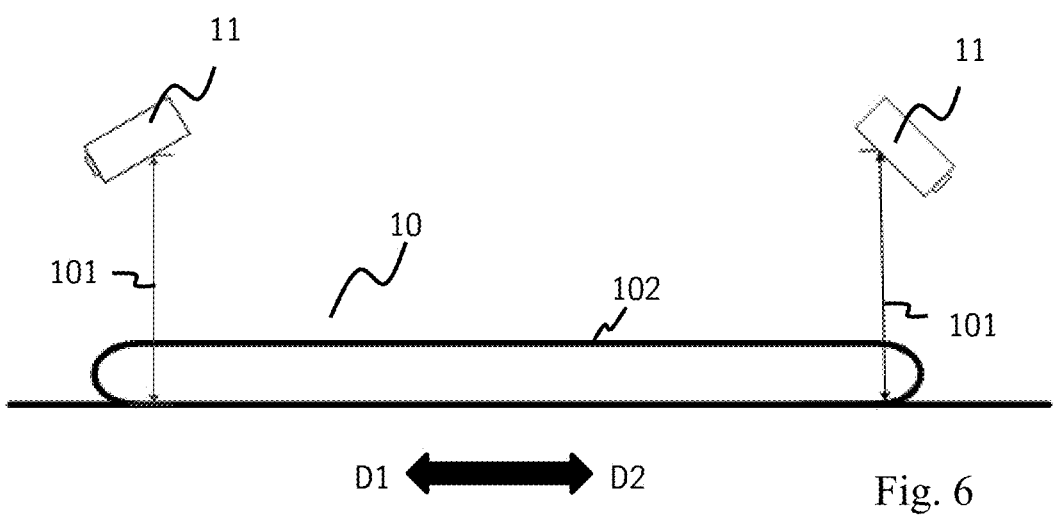
FIG. 6 is a side schematic view of a moving walkway system having a monitoring device disposed at each of its terminal ends.

FIGS. 5 and 6 respectively show an escalator 10 and a moving walk 10, each comprising at their respective terminal ends a monitoring device 11. In each example, the monitoring device is a 3D camera positioned for example 3 m above floor level, wherein the floor level relates to the floor on which the landing area is located.

What is claimed is:

1. A method of predicting whether an approaching passenger intends to travel on a passenger moving system having at least one movable pallet, the method comprising:
    positioning at least one monitoring device in the vicinity of the passenger moving system;
    monitoring, by the at least one monitoring device, a detection area of the passenger moving system having at least a first detection area;
    detecting a passenger in the at least first detection area;
    monitoring a trajectory of the passenger;
    generating a predicted trajectory of the passenger, based on the monitored trajectory, which predicted trajectory reaches an entrance to the passenger moving system; and
    triggering a response at a control unit of the passenger moving system in response to the predicted trajectory reaching the entrance to the passenger moving system.

2. The method of claim 1, further comprising starting the passenger moving system based on the predicted trajectory of the passenger.

3. The method of claim 1, further comprising starting the passenger moving system in response to the the predicted trajectory being >0, wherein the trajectory is measured against the longitudinal axis which is defined by the direction of the movement of the at least one movable pallet.

4. The method of claim 1, wherein the monitoring device is located at least 1 meter above floor level at a height that allows the monitoring of at least the first detection area.

5. The method of claim 1, wherein the monitoring device is located up to 1 meter above floor level at a height that allows the monitoring of at least the first detection area.

6. The method of claim 1, wherein the detection area further includes a second detection area, larger than the first detection area, that is monitored by the monitoring device.

7. The method of claim 1, wherein the monitoring device is a 3D sensor.

8. The method of claim 1, further comprising:
   detecting anomalous behavior in the monitoring device, by a self-diagnostic system that is part of the monitoring device; and
   activating, by the self-diagnostic system, the passenger moving system into a state of continuous operation while the anomalous behavior is detected.

9. The method of claim 1, wherein the monitoring device is a 3D sensor that monitors the position and trajectory of the passenger approaching the passenger moving system.

* * * * *